United States Patent
Alshehri et al.

(10) Patent No.: US 10,472,553 B2
(45) Date of Patent: Nov. 12, 2019

(54) DELAYED POLYMER GELATION USING LOW TOTAL DISSOLVED SOLIDS BRINE

(71) Applicant: Saudi Arabian Oil Company, Dhahran (SA)

(72) Inventors: Amar J. Alshehri, Dhahran (SA); Jinxun Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/693,879

(22) Filed: Sep. 1, 2017

(65) Prior Publication Data
US 2019/0071596 A1 Mar. 7, 2019

(51) Int. Cl.
| | |
|---|---|
| E21B 33/138 | (2006.01) |
| C09K 8/42 | (2006.01) |
| C08J 3/075 | (2006.01) |
| C08J 3/24 | (2006.01) |
| C08K 13/02 | (2006.01) |
| C09K 8/44 | (2006.01) |
| C09K 8/504 | (2006.01) |
| C09K 8/512 | (2006.01) |

(52) U.S. Cl.
CPC ............ *C09K 8/426* (2013.01); *C08J 3/075* (2013.01); *C08J 3/24* (2013.01); *C08K 13/02* (2013.01); *C09K 8/44* (2013.01); *C09K 8/5045* (2013.01); *C09K 8/512* (2013.01); *E21B 33/138* (2013.01); *C08J 2333/26* (2013.01)

(58) Field of Classification Search
None
See application file for complete search history.

(56) References Cited

U.S. PATENT DOCUMENTS

| | | | |
|---|---|---|---|
| 3,762,476 A | * | 10/1973 | Gall ................. C09K 8/887 166/270 |
| 4,582,452 A | | 4/1986 | Sabi et al. |
| 4,630,678 A | * | 12/1986 | Mumallah ............ E21B 43/261 166/271 |
| 4,730,675 A | | 3/1988 | Wygant et al. |
| 4,995,461 A | | 2/1991 | Sydansk |
| 5,421,411 A | | 6/1995 | Sydansk |
| 5,423,380 A | | 6/1995 | Johnston et al. |
| 5,547,025 A | | 8/1996 | Ahmed et al. |
| 5,849,674 A | | 12/1998 | Fox et al. |
| 5,947,644 A | | 9/1999 | Gibbons et al. |
| 6,025,304 A | | 2/2000 | Southwell et al. |

(Continued)

FOREIGN PATENT DOCUMENTS

WO 2014082001 A1 5/2014

OTHER PUBLICATIONS

Lockhart, Thomas P., et al., "New Checmistry for the Placement of Chromium(III)/Polymer Gels in High-Temperature Reservoirs" SPE 24194, SPE Production & Facilities, Nov. 1994; pp. 273-279.

(Continued)

*Primary Examiner* — Andrew Sue-Ako
(74) *Attorney, Agent, or Firm* — Bracewell LLP; Constance G. Rhebergen; Linda L. Morgan

(57) ABSTRACT

A method for placing a gel deep inside a subterranean formation includes combining a crosslinkable polymer, a chromium (III) crosslinking agent, and a brine to form a gelation solution. The gelation solution is pumped within a subterranean wellbore. The gelation time of the gelation solution is elongated by reducing the total dissolved solids of the brine so that the gelation solution penetrates deep into the subterranean formation away from the wellbore before a gel is formed.

14 Claims, 3 Drawing Sheets

(56) References Cited

U.S. PATENT DOCUMENTS

| | | | |
|---|---|---|---|
| 2007/0246426 A1* | 10/2007 | Collins | C09K 8/528 210/651 |
| 2012/0018160 A1* | 1/2012 | Al-Yousef | C09K 8/58 166/305.1 |
| 2014/0144628 A1 | 5/2014 | Moradi-Araghi et al. | |
| 2015/0159079 A1 | 6/2015 | Huh et al. | |
| 2015/0191647 A1 | 7/2015 | Kakadjian et al. | |
| 2016/0137906 A1 | 5/2016 | Guan et al. | |

OTHER PUBLICATIONS

Nasr-El-Din, H.A., "Field Application of Gelling Polymers in Saudi Arabia" SPE 39615, SPE/DOE Improved Oil Recovery Symposium, Tulsa, OK, Apr. 19-22; pp. 133-146.

Sanders, G.S., et al., "Successful Gas Shutoff With Polymer Gel Using Temperature Modeling and Selective Placement in the Prudhoe Bay Field" SPE 28502, SPE 69th Annual Technical Conference and Exhibition, Sep. 25-28, 1994; pp. 381-396.

Sydansk, Robert D., "A Newly Developed Chromium(III) Gel Technology" SPE 19308, SPE Reservoir Engineering, Aug. 1990; pp. 346-352.

Sydansk, Robert D., "Acrylamide-Polymer/Chromium(III)-Caboxylate Gels for Near Wellbore Matrix Treatments" SPE 20214, SPE Advanced Technology Series, vol. 1, No. 1; pp. 146-152.

The International Search Report and Written Opinion for related PCT application PCT/US2018/049045 dated Nov. 13, 2018.

Sydansk et al., "A New Conformance-Improvement-Treatment Chromium (III) Gel Technology", SPE / DOE 17329, 1988, pp. 99-114, Society of Petroleum Engineers.

* cited by examiner

DELAYED POLYMER GELATION USING LOW TOTAL DISSOLVED SOLIDS BRINE

BACKGROUND

1. Field of the Disclosure

The present disclosure relates in general to plugging subterranean formations, and more particularly to polymer gels for conformance improvement in hydrocarbon production operations.

2. Description of the Related Art

There may be times during the life of a subterranean well when an operator desires to improve the production performance of the subterranean well by plugging a portion or all of certain subterranean formations associated with such subterranean well. For example, an operator may wish to plug all or a portion of a particular subterranean formation to improve sweep treatments, shut-off water and gas production, shut-off gas in oil wells, abandon a particular zone, shut-off natural or propped fractures or otherwise alter the permeability of the subterranean formation.

Polymer gels can be used as a diverting or blocking agent in the treatment of injection and production wells in the oil industry. These treatments are termed as conformance improvement, which is a common practice to improve oil recovery from a heterogeneous hydrocarbon-bearing reservoir. When a gelant solution is injected through injection wells, a solid-like gel system with a 3-D network structure will be formed in the hydrocarbon reservoir. As a result, any subsequent injection water will be diverted to the un-swept or less-swept regions. In shutoff applications, a gelant can be injected through production wells to block or reduce the unwanted excess water or gas production. In chemical enhanced oil recovery (EOR) applications, expensive chemicals such as surfactants and polymers are injected into the reservoir to mobilize remaining oil. In fractured reservoirs, injected chemicals channel through fractures towards producers with minimal interactions with the reservoir and matrix. To mitigate that, gels can be injected before the EOR chemicals to block fractures and conductive zones in the reservoir and help divert the EOR chemicals towards the reservoir and matrix. The low cost and ease of application at well sites are some of the advantages of using polymer gels for conformance improvement.

Gelation time is known as the time when the gelant solution starts to form a gel. Gelation time can be significantly reduced at high temperature. The polymer crosslinking reaction with a simple Cr(III) ion is very fast. For in-depth gel treatment of high temperature reservoirs, delayed gelation is required to ensure the gelant solution can penetrate deep into the reservoir before the gel is formed. The selection of certain crosslinkers, using a low-hydrolysis polymer, and conducting a cold water pre-flush are methods that can be used to delay gelation. A more commonly used technique to elongate the gelation time is to use a chemical additive retardation agent. However, using retarders will decrease gel strength.

SUMMARY OF THE DISCLOSURE

Embodiments of this disclosure provide compositions and methods to form crosslinked polymer gels for conformance improvement in a hydrocarbon-bearing reservoir. More specifically, compositions and methods are disclosed for elongating gelation time by using low total dissolved solids brines, or combining low total dissolved solids brines with adjusted brine compositions, or by combining low total dissolved solids brines with retarders, for preparing the gel systems for conformance improvement.

In an embodiment of this disclosure, a method for placing a gel deep inside a subterranean formation includes combining a crosslinkable polymer, a chromium (III) crosslinking agent, and a brine to form a gelation solution. The gelation solution is pumped within a subterranean wellbore. The gelation time of the gelation solution is elongated by reducing the total dissolved solids of the brine so that the gelation solution penetrates deep into the subterranean formation away from the wellbore before a gel is formed.

In alternate embodiments, the total dissolved solids of the brine can be reduced to less than 3,000 ppm. The gelation solution can be free of a retarder and the gelation time can be elongated by more than an hour or by more than twenty-four hours by reducing the total dissolved solids of the brine. Retarder can be added to the gelation solution and the gelation time can be elongated by more than two hours or by more than twenty-four hours by the combined use of low salinity brine and retarder. The crosslinkable polymer and the chromium (III) crosslinking agent can be mixed within the subterranean wellbore. Alternately, the crosslinkable polymer and the chromium (III) crosslinking agent can be mixed within the subterranean formation.

In an alternate embodiment of this disclosure, a method for placing a gel deep inside a subterranean formation includes combining a crosslinkable polymer, a chromium (III) crosslinking agent, and a brine to form a gelation solution. The gelation solution is pumped within a subterranean wellbore. The viscosity of the gelation solution within the subterranean wellbore is less than 10 cp. The gelation time of the gelation solution is elongated by reducing the total dissolved solids of the brine to a range between 500 ppm and 11,500 ppm so that the gelation solution penetrates deep into the subterranean formation away from the wellbore before a gel is formed.

In alternate embodiments, the total dissolved solids of the brine can be reduced to less than 3,000 ppm. The brine can be a seawater and the total dissolved solids of the brine can be reduced to 5% of the total dissolved solids of the seawater. By reducing the total dissolved solids of the brine to 5% of the seawater salinity, the gelation time can be elongated by more than three hours at 80° C. and more than one hour at 95° C. Retarder can be added to the gelation solution. When adding retarder to the gelation solution, a concentration of the crosslinkable polymer can be increased and a concentration of the chromium (III) crosslinking agent can be increased. The gelation time can be elongated by more than two hours or by more than twenty-four hours by combining the use of retarder and low salinity brine.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The Specification, which includes the Summary of Disclosure, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the meaning commonly understood by one of ordinary skill in the art to which this disclosure relates unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
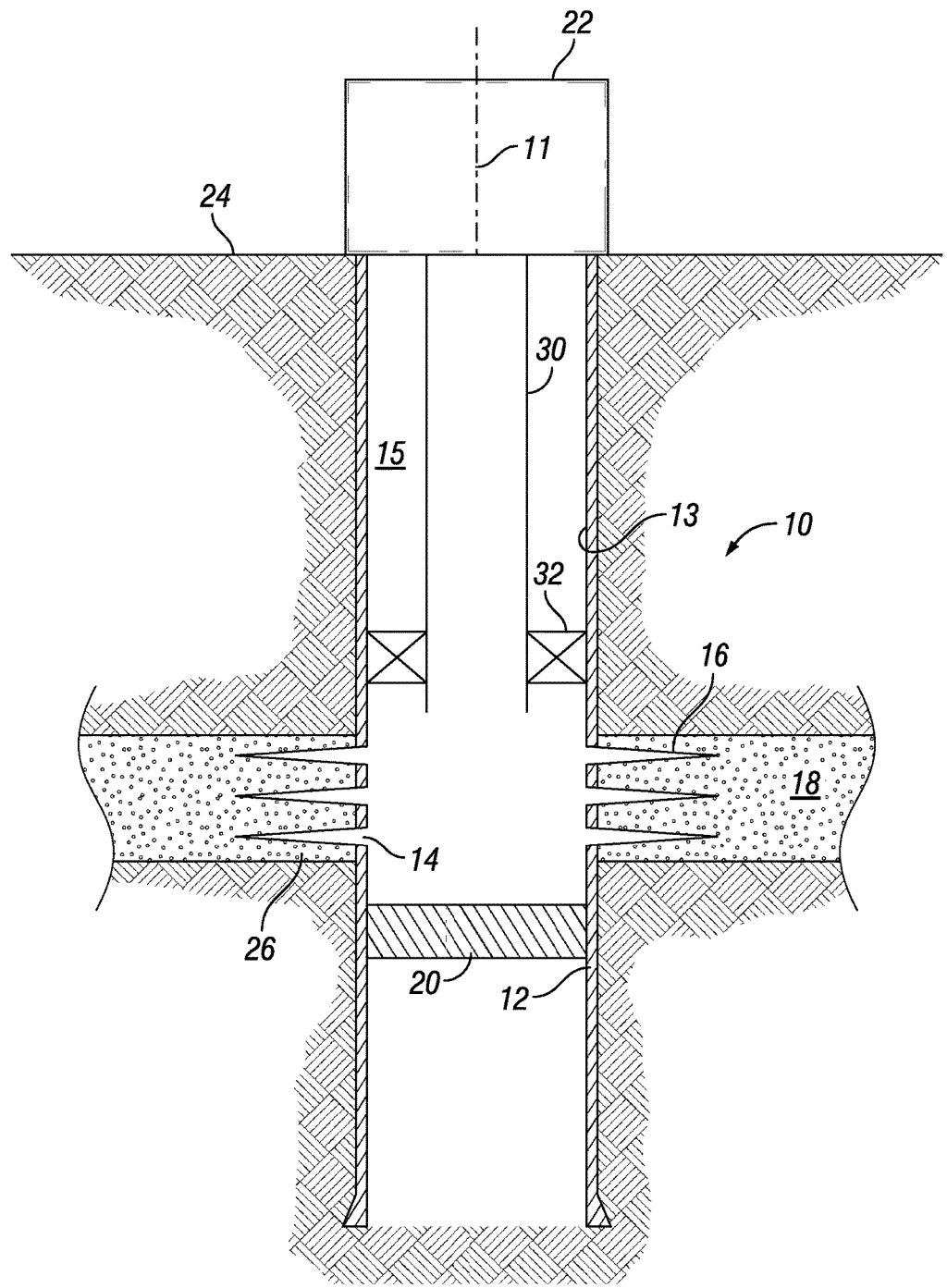
FIG. 1 is a schematic section view of a subterranean well with a system for pumping a gelation solution within a wellbore deep into a subterranean formation, in accordance with an embodiment of this disclosure.

Looking at FIG. 1, subterranean well 10 can be a subterranean well used in hydrocarbon production operations. Subterranean well 10 can be a production well or an injection well. Subterranean well 10 can be lined with cement and casing 12 in a manner known in the art. Subterranean well 10 can have a central axis 11. Subterranean well 10 can be a vertical cased well, as shown, or can be open hole or can be angled or slanted, horizontal, or can be a multilateral well. Subterranean well 10 can have an inner diameter surface 13. Inner diameter surface 13 of subterranean well 10 can be the inner diameter surface of casing 12. Subterranean well 10 can have a wellbore 15 that can be an inner bore of casing 12. Perforations 14 can extend through the sidewall of casing 12. Perforations 14 can be in fluid communication with fractures 16 that extend into subterranean formation 18. Plug 20 can seal against inner diameter surface 13 of casing 12 to prevent fluid flow past plug 20 within casing 12.

FIG. 1 shows only one set of perforations 14 into one subterranean formation 18. In alternate embodiments there may be additional subterranean formations 18 and casing 12 can include additional sets of perforations 14 through casing 12 into such additional subterranean formations 18. A wellhead assembly 22 can be located at surface 24, such as an earth's surface, at an upper end of subterranean well 10.

Subterranean formation 18 can contain a fluid such as a liquid or gaseous hydrocarbon, water, steam, or a combination thereof. The fluid within subterranean formation 18 can pass through perforations 14 and into subterranean well 10.

During the life of subterranean well 10, it may be desirable to reduce or completely plug the flow of fluids within subterranean formation 18. As an example, an operator may wish to plug all or a portion of subterranean formation 18 to improve sweep treatments, shut-off water or gas production, abandon subterranean formation 18, shut-off fractures 16 or otherwise alter the permeability of subterranean formation 18.

In order to form a permanent plug in subterranean formation 18, a plugging material 26 can be used to fill pores of subterranean formation 18 deep within subterranean formation 18, away from wellbore 15. In embodiments of this disclosure, plugging material 26 is a gel that has an elongated gelation time.

Gels are viscoelastic materials, exhibiting properties between elastic solids and viscous liquids. As used herein, gelation time refers to the amount of time from the mixing of the gelation solution until the gel starts to form. The gelation time is the time point when evident elastic behavior is observed in a gel sample. A bottle test can be used to observe and rapidly assess gelation time. A method of determining gelation time is described by Lockhart, T. P. and Albonico P., 1994, *New chemistry for the placement of Chromium (III)/polymer gels in high-temperature reservoirs*, SPE Production & Facilities, 9(4), 273-279 ("Lockhart et al."). At the gelation time, the elastic tongue-shaped gelant would partially flow out the vial with a tongue of several centimeters long. In accordance with the procedure of Lockhart et al., at the gelation point, the gelant would flow to the cap when the sample tube is capped and inverted, but when uncapped the elastic tongue-shaped gelant would partially flow out with a tongue of several centimeters long. The solution can flow at this time point, but its flow ability is limited. This corresponds approximately to the gel strength code of "D" in accordance with the scale outlined in Sydansk, R. D., 1990. *A newly developed chromium (III) gel technology*, SPE Reservoir Engineering, 5(3), 346-352 ("Sydansk"), which is a moderately flowing gel, and does not correspond to a gel at full strength.

It is noted that gelation time differs from gelation rate. While gelation time is the time to the initial onset of gel formation, gelation rate is the time required to reach full gel strength. Embodiments of this application therefore relate to the time required to form a gel and not to a measure of a strength of the gel over time, which is a measure of the strength of the gel after the gelation time has been reached and passed.

A distribution system can be used to deliver the components of the gelation solution into wellbore 15 of subterranean well 10 so that the gelation solution penetrates pores of subterranean formation 18. The distribution system of the Example of FIG. 1 includes tubing 30 that extends within casing 12. The components of the gelation solution are delivered to subterranean formation 18 through tubing 30. The gelation solution is pumped within wellbore 15 of subterranean well 10. Tubing packer 32 can circumscribe tubing 30 and prevent fluids from passing tubing packer 32 through the annular space between the outer diameter of tubing 30 and the inner diameter surface 13 of subterranean well 10. Plug 20 limits the downward travel of the components of the gelation solution within casing 12. The components of the gelation solution can be pumped through tubing 30 into wellbore 15 and pass through perforations 14 of casing 12 to penetrate pores of subterranean formation 18. In alternate embodiments, tubing packer 32 and packer 20 are not included.

The gelation solution contains a crosslinkable polymer, a chromium (III) crosslinking agent, and a brine. The crosslinkable polymer can be any water-soluble carboxylate-containing polymer, either biopolymer or synthetic polymer. Partially hydrolyzed polyacrylamides, carboxymethyl cellulose (CMC), carboxymethylhydroxyethyl cellulose (CM-HEC), and xanthan gum are some of the suitable polymer examples. The crosslinking agent can be multivalent cations, such as Cr(III), Al(III), Ti(III) and Zr(IV). Organic crosslinkers can also be used to crosslink polymers through covalent bonding, even in the absence of carboxylate group. Examples of organic crosslinkers include, but not limited to, phenol, formaldehyde, resorcinol, hydroquinone, hexamethylenetetramine (HMTA) and terephthalaldehyde. The viscosity of the gelation solution in wellbore 15 and in the near wellbore region of the injection well can be less than 10 cp so that the gelation solution can travel within subterranean formation 18. Because of the delayed gelation time, the gelation solution can reach a distance deep within subterranean formation 18 that is far from wellbore 15 before a gel is formed. The gelation solution can form a gel within the pores of subterranean formation 18 to improve sweep treatments, shut-off water and gas production, shut-off gas in oil wells, abandon a particular zone, shut-off natural or propped fractures or otherwise alter the permeability of the subterranean formation.

Figure 2:
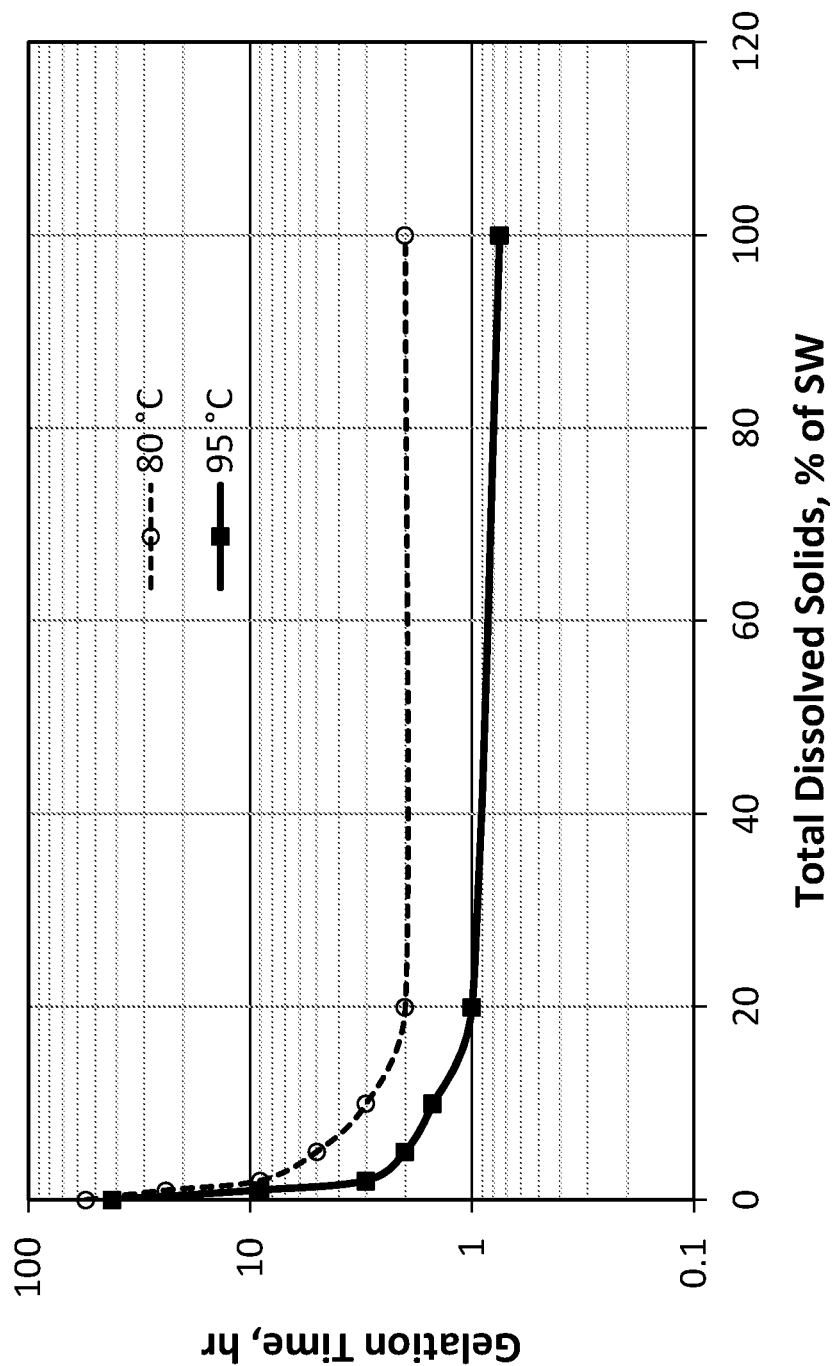
FIG. 2 is a chart showing experimental results of the effect of brine salinity on gelation time for a gelation solution with 4000 mg/L polymer and 100 mg/L Cr(III) at 80° C. and 95° C. Brine salinity ranged from 0 to 100% of seawater salinity.

In order to delay the gelation time, the total dissolved solids of the brine can be reduced by mixing fresh water with the injection brine. Deionized or other type of low salinity water can also be used to reduce the total dissolved solids of the brine. In certain embodiments, the total dissolved solids can be reduced to less than 3,000 ppm. In order to retain the strength of the resulting gel, the gelation solution can be free of a retarder. Free of a retarder, the gelation time can be elongated by more than two days by using fresh water for the example gel system, as can be seen in FIG. 2. If using fresh water to prepare the polymer solution, the gelation time can be elongated by more than 50 hours at 80° C. and more than 40 hours at 95° C. As shown in FIG. 2, at 80° C., when reducing the total dissolved solids of the brine to 10% of seawater, the gelation time is elongated by an hour, when reducing the total dissolved solids of the brine to 5% of seawater, the gelation time is elongated by three hours. Further reducing the total dissolved solids will further elongate the gelation time. When the brine salinity is reduced to zero (using fresh water), gelation time is elongated to 55 hours. For this example gel system, the gelation time is elongated more significantly when the brine salinity is lower than 5% of seawater salinity, which is equivalent to a brine having total dissolved solids of less than 3,000 ppm.

Figure 3:
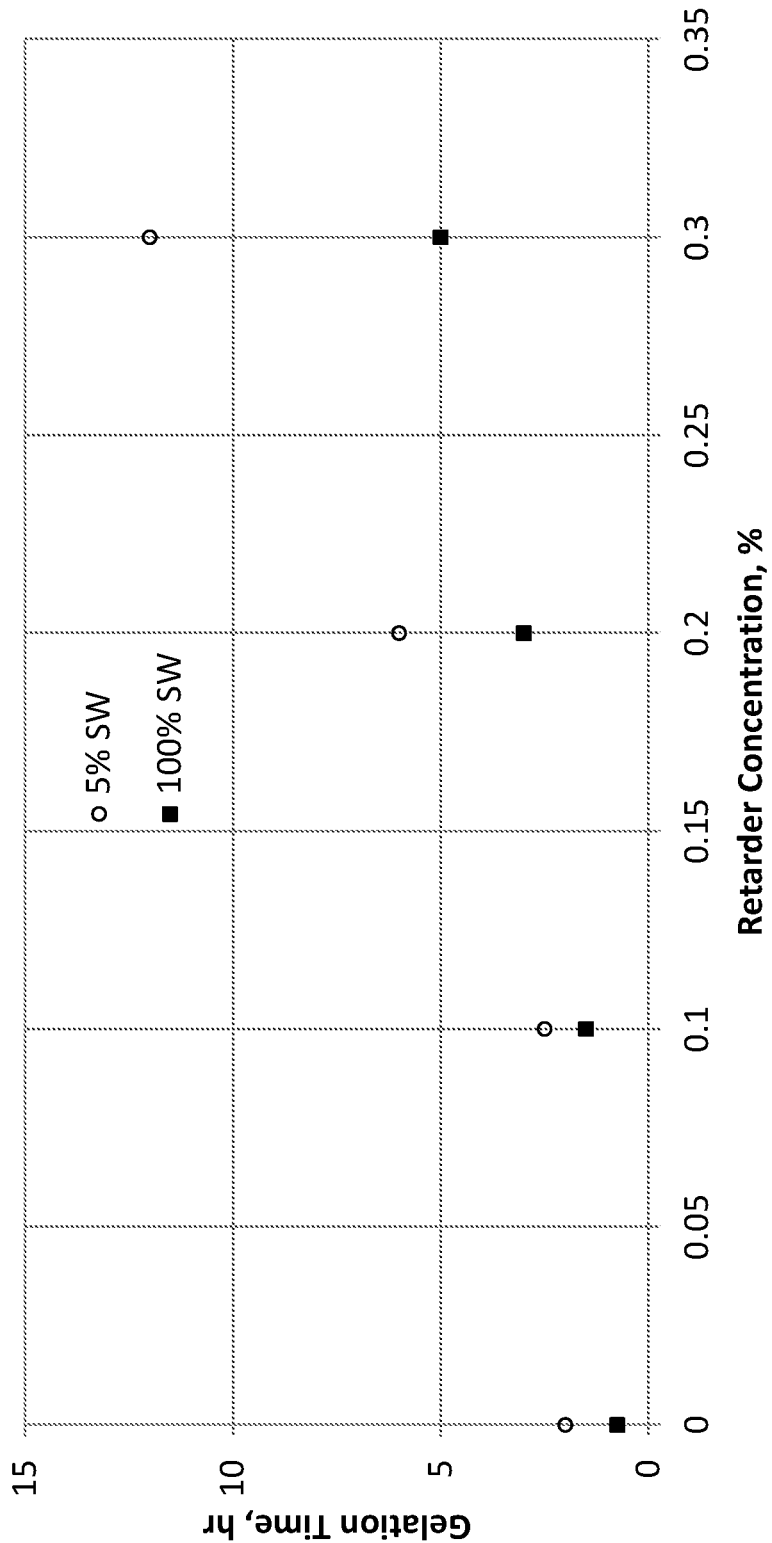
FIG. 3 is a chart showing experimental results of the effect of retarder concentration and brine salinity on gelation time for a gelation solution with 4000 mg/L polymer and 100 mg/L Cr(III) at 95° C. Two brine salinity, 5% and 100% seawater, were used for the tests.

In other embodiments, in order to further elongate the gelation time, the gelation solution can include a retarder. As an example, the retarder can be sodium lactate, acetate, malonate and glycolate, or other known retarding agents. With the retarder of sodium lactate, the gelation time can be elongated by more than eleven hours by combined with the reduction of total dissolved solids of the brine, as can be seen in the example of FIG. 3. As shown in FIG. 3, at 95° C., when reducing the total dissolved solids of the brine to 5% of seawater, the gelation time is elongated by more than five hours with a retarder concentration of 0.2%. Further increasing the concentration of retarder will further elongate the gelation time. In order to retain a strength of the resulting gel when using a retarder, the concentration of the crosslinkable polymer and the concentration of the chromium (III) crosslinking agent can be increased when using a retarder, relative to embodiments that are free of a retarder.

In other embodiments, the brine composition can be adjusted to further elongate the gelation time. For example, the divalent ions can be removed from the brine, or replaced with other salts. In the Examples section of this disclosure, certain examples include seawater, monovalent and divalent salts and or seawater with divalent cation salts replaced by other salts. The results shown in the Examples section show that divalent salt can reduce gelation time, while monovalent salt can delay gelation. Replacing divalent salts by sodium acetate can significantly delay gelation.

In order to form the gelation solution, the crosslinkable polymer, the chromium (III) crosslinking agent, and the brine are combined. In certain embodiments, the crosslinkable polymer, the chromium (III) crosslinking agent, and the brine are combined before being pumped into wellbore 15. In other embodiments, the crosslinkable polymer, the chromium (III) crosslinking agent, and the brine are mixed within wellbore 15. As an example, the crosslinkable polymer and the chromium (III) crosslinking agent can be injected into subterranean well 10 in separate tubing and can be mixed together downhole. Alternately, the crosslinkable polymer and the chromium (III) crosslinking agent can be injected sequentially into subterranean well 10, separated by a brine slug as a buffer, and can be mixed within subterranean formation 18.

EXAMPLES

This section provides results of laboratory experiments of certain embodiments of the gel composition of this application. In the laboratory experiments, a synthetic seawater (SW) was prepared with total dissolved solids of 57,612 ppm. The detailed brine composition is shown in Table 1. Lower salinity brines were then prepared based on this synthetic seawater by diluting the synthetic seawater with deionized water. Note that the term salinity and total dissolved solids are used interchangeably in this disclosure. Gelation solutions were prepared by mixing a polymer solution with a crosslinking agent solution in brines with varied salinities. The polymer used in the example composition of the laboratory experiment was a copolymer of acrylamide and arcylamide tert-butyl sulfonate with a sulfonation degree of about 25%. The molecular weight of the polymer was 12 million. The crosslinking agent used in this study was chromium(III), and its stock solution was prepared using chromium(III) acetate. For the laboratory experiment, the example active concentrations of the polymer and the Cr(III) were 4000 mg/L and 100 mg/L, respectively. Note that the units mg/L and ppm are used interchangeably in this disclosure.

TABLE 1

Synthetic Brine Composition

| | |
|---|---|
| NaCl, mg/L | 41,041 |
| $CaCl_2 \cdot 2H_2O$, mg/L | 2,384 |
| $MgCl_2 \cdot 6H_2O$, mg/L | 17,645 |
| $Na_2SO_4$, mg/L | 6,343 |
| $NaHCO_3$, mg/L | 165 |

Bottle tests were conducted at two different temperatures of 80° C. and 95° C. The gelant ability-to-flow (flowability) was periodically observed by slightly tilting and inverting the bottles. Gelation time was determined as the time point when an elastic tongue-shaped gelant would partially flow out with a tongue of several centimeters long when the sample bottle is uncapped and inverted. FIG. 2 summarizes the results of bottle tests on the gel system of 4000 mg/L polymer and 100 mg/L Cr(III) in varied brine salinities. It can be seen that the gelation time is significantly elongated with decreasing brine salinity, especially when brine salinity is lower than 10% of seawater salinity. In addition, further beneficial elongation of the gelation time is achieve when brine salinity is lower than 5% of seawater salinity, which results in a brine with total dissolved solids of less than 3,000 ppm. At a same salinity, gelation time is longer at lower temperature, and the difference in gelation time is more evident at lower salinity.

This relationship of longer gelation time at lower brine salinity is therefore proposed as a convenient strategy for delaying gelation process. For field application, the reservoir can optionally be pre-flushed with fresh water to condition the reservoir for gel treatment. A low salinity brine can then be selected to prepare a gelation solution based on the specific requirement for gelation time. Salinity of the brine in the gel mixture can be altered until the desired gelation time is achieved. Embodiments of this disclosure are particularly effective for the treatment of low temperature reservoirs, for example, lower than 65° C., because at lower temperature gelation time is significantly longer and decreasing salinity can elongate the gelation more effectively.

Table 2 presents additional results of gelation delaying by combined use of low salinity brine and low polymer solution, or by modifying brine composition. Gelation tests were conducted at 95° C. The three samples in Group A, Samples A1 to A3, had polymer concentrations decreased from 4000 mg/L to 2500 mg/L, and a same crosslinker concentration of 100 mg/L. Results showed that gelation time tended to be longer at lower polymer concentration. Seawater was used for this test group. For comparison, Group B also had three samples with the same decreased polymer concentrations and a same crosslinker concentration. But a lower salinity brine, 10% of seawater, was used for the tests in Group B. The gelation time of Sample B3 was 4.5 hours longer than that of Sample B1, and this increased gelation time by decreasing polymer concentration was much longer than the corresponding increment in Group A. Therefore, decreasing polymer concentration was more effective in delaying gelation when using low salinity brine. Comparing the results of Samples A1 and B3, it can be seen that gelation time can be significantly elongated by the combined use of low salinity brine and low polymer concentration.

Groups C and D were tests using different salts for the brine, with a same polymer concentration of 4000 mg/L and a same crosslinker concentration of 100 mg/L. The total salinity of the brines in Group C was the same, and the results showed that divalent salts tended to decrease gelation time. A modified seawater was used in Sample D1, with the $CaCl_2 \cdot 2H_2O$ and $MgCl_2 \cdot 6H_2O$ in the seawater composition (Table 1) replaced by 0.8% sodium acetate (NaAc) and 0.8% ammonium chloride ($NH_4Cl$). The gelation time of this sample was 24 hours, which was significantly longer than the sample using the original seawater.

TABLE 2

Results of gelation time at 95° C.-
Effects of brine and polymer concentration

| Sample | Polymer conc. mg/L | Cr(III) conc. mg/L | Brine | Gelation time hr |
|---|---|---|---|---|
| A1 | 4000 | 100 | 100% SW | 0.75 |
| A2 | 3000 | 100 | 100% SW | 1.5 |
| A3 | 2500 | 100 | 100% SW | 2.0 |
| B1 | 4000 | 100 | 10% SW | 1.5 |
| B2 | 3000 | 100 | 10% SW | 4.0 |
| B3 | 2500 | 100 | 10% SW | 6.0 |
| C1 | 4000 | 100 | 5% SW (0.3% TDS) | 2.0 |
| C2 | 4000 | 100 | 0.3% KCl | 3.0 |
| C3 | 4000 | 100 | 0.3% $MgCl_2$ | 1.0 |
| C4 | 4000 | 100 | 0.3% $Na_2SO_4$ | 1.0 |
| D1 | 4000 | 100 | MSW* | 24 |

When decreasing brine salinity alone cannot meet the requirement of longer gelation time, combining the use of retardant agent and low salinity brine is another option. Sodium lactate was used as a retarder in the example shown in FIG. 3. In additional laboratory experiments, gelation solutions were prepared in two different brines with salinity of 5% SW and 100% SW. Retarder was added to the polymer solution before adding the crosslinker. The same polymer concentration of 4000 mg/L and the same Cr(III) concentration of 100 mg/L were used with varied retarder concentrations ranging from 0 to 0.3% by weight. Bottle tests were conducted at 95° C. for determining gelation time, and results are plotted in FIG. 3. It can be seen that the gelation time is significantly elongated by increasing the retarder concentration. At a same retarder concentration gelation time is much longer in low salinity brine, and the increase in gelation time is more evident at higher retarder concentration. These relationships provide additional methods to achieve further gelation delays.

Table 3 provides results using two additional retardant agents, sodium malonate and ethylenediaminetetraacetic acid (EDTA). A same polymer concentration of 4000 mg/L and a same crosslinker concentration of 200 mg/L were used. Two different brines, 100% SW and 5% SW, were used for comparison, and tests were conducted at 95° C. Results showed that the combined use of retardant agent and low salinity brine could significantly elongate gelation time.

TABLE 3

Results of gelation time at 95° C.-Effects of retarder and brine salinity

| Sample | Polymer conc. mg/L | Cr(III) conc. mg/L | Brine | Retarder | Gelation time hr |
|---|---|---|---|---|---|
| E1 | 4000 | 200 | 100% SW | 0.1% Sodium Malonate | 20 |
| E2 | 4000 | 200 | 5% SW | 0.1% Sodium Malonate | 48 |
| F1 | 4000 | 200 | 100% SW | 0.05% EDTA | 6 |
| F2 | 4000 | 200 | 100% SW | 0.07% EDTA | 20 |
| F3 | 4000 | 200 | 5% SW | 0.05% EDTA | 9 |
| F4 | 4000 | 200 | 5% SW | 0.07% EDTA | 30 |

The laboratory experiments have provided unexpected results. Salinity effect on gelation time is complex. Sydansk found that the gelation rate was independent of salinity in the range of 1,000 to 30,000 ppm NaCl, while many other studies (Al-Muntasheri, G. A., Nasr-El-Din, H. A., Al-Noaimi, K. R. and Zitha, P. L. J., 2009, *A Study of polyacrylamide-based gels crosslinked with polyethyleneimine*, SPE Journal, 14(2), 245-251; Shriwal P. and Lane R. H., 2012, *Impacts of timing of crosslinker addition on water shutoff polymer gel properties*, Paper SPE 153241 presented at the Eighteenth SPE Improved Oil Recovery Symposium held in Tulsa, Okla., USA, 14-18 April; and Yadav, U. S and Mahto, V., 2013, *Investigating the Effect of Several Parameters on the Gelation Behavior of Partially Hydrolyzed Polyacrylamide—Hexamine—Hydroquinone Gels*, Ind. Eng. Chem. Res. 52, 9532-9537.) showed that the gelation time was increased at higher salinity. Therefore embodiments of this disclosure that provide for the elongation of gelation time by using low salinity brine, especially when salinity is lower than 3,000 ppm (around 5% seawater salinity), provide an unexpected improvement over current gelation solutions.

Embodiments of this disclosure therefore disclose systems and methods for providing a gelation solution with an elongated gelation time. Systems and methods of this disclosure provide a gel with increased control over gelation time, can eliminate the need of retardant (an expensive chemical) to control gelation time, is environmental friendly and cost effective, and minimizes formation damage.

Embodiments described herein, therefore, are well adapted to carry out the objects and attain the ends and advantages mentioned, as well as others inherent therein. While certain embodiments have been described for purposes of disclosure, numerous changes exist in the details of procedures for accomplishing the desired results. These and other similar modifications will readily suggest themselves to those skilled in the art, and are intended to be encompassed within the scope of the present disclosure disclosed herein and the scope of the appended claims.

What is claimed is:

1. A method for placing a gel inside a subterranean formation, the method including:
   providing a brine and reducing the total dissolved solids of the brine to form a brine solution, where the brine solution comprises a sodium chloride (NaCl), a sodium sulfate ($Na_2SO_4$), a sodium bicarbonate ($NaHCO_3$), a sodium acetate (NaAc), and an ammonium chloride ($NH_4Cl$), wherein the brine solution is free of divalent cation salts;
   combining a crosslinkable polymer, a chromium (III) crosslinking agent, and the brine solution to form a gelation solution;
   pumping the gelation solution within a subterranean wellbore to form a permanent plug within the subterranean formation away from the subterranean wellbore; wherein
   an initial onset of gel formation of the gelation solution is elongated by reducing the total dissolved solids of the brine so that the gelation solution penetrates into the subterranean formation away from the wellbore before the initial onset of gel formation.

2. The method of claim 1, wherein the total dissolved solids of the brine is reduced to less than 3,000 ppm.

3. The method of claim 1, wherein the gelation solution is free of a retarder.

4. The method of claim 3, wherein the initial onset of gel formation is elongated by more than an hour by reducing the total dissolved solids of the brine.

5. The method of claim 4, wherein the initial onset of gel formation is elongated by more than twenty-four hours by reducing the total dissolved solids of the brine.

6. The method of claim 1, further including adding retarder to the gelation solution.

7. The method of claim 6, wherein the initial onset of gel formation is elongated by more than two hours by reducing the total dissolved solids of the brine.

8. The method of claim 7, wherein the initial onset of gel formation is elongated by more than twenty-four hours by reducing the total dissolved solids of the brine.

9. The method of claim 1, wherein the crosslinkable polymer, the chromium (III), and the crosslinking agent are mixed within the subterranean wellbore.

10. The method of claim 1, wherein the crosslinkable polymer, the chromium (III), and the crosslinking agent are mixed within the subterranean formation.

11. A method for placing a gel inside a subterranean formation, the method including:
    providing a synthetic seawater comprising a sodium chloride (NaCl), a sodium sulfate ($Na_2SO_4$), a sodium bicarbonate ($NaHCO_3$), a sodium acetate (NaAc) and an ammonium chloride ($NH_4Cl$) to form a brine, wherein the brine is free of divalent cation salts;
    combining a crosslinkable polymer, a chromium (III) crosslinking agent, and the brine solution to form a gelation solution;
    pumping the gelation solution within a subterranean wellbore to form a permanent plug within the subterranean formation away from the subterranean wellbore; wherein a viscosity of the gelation solution within the subterranean wellbore is less than 10 cp; and
    an initial onset of gel formation of the gelation solution is elongated so that the gelation solution penetrates into the subterranean formation away from the wellbore before the initial onset of gel formation.

12. The method of claim 11, further including adding retarder to the gelation solution.

13. The method of claim 12, wherein when the adding retarder to the gelation solution a concentration of the crosslinkable polymer is increased and a concentration of the chromium (III) crosslinking agent is increased.

14. The method of claim 13, wherein the initial onset of gel formation is elongated to twenty-four hours.

* * * * *